July 2, 1968 — E. GEREB — 3,390,802
METHOD AND EQUIPMENT FOR REDUCING WATER EVAPORATION
Filed Jan. 14, 1966

INVENTOR.
BY Eliezer Gereb
Alvin Browdy
attorney

United States Patent Office 3,390,802
Patented July 2, 1968

3,390,802
METHOD AND EQUIPMENT FOR REDUCING WATER EVAPORATION
Eliezer Gereb, 16A Maimon St.,
Neve Shaanan, Haifa, Israel
Filed Jan. 14, 1966, Ser. No. 520,722
Claims priority, application Israel, Jan. 15, 1965,
22,786
5 Claims. (Cl. 220—26)

ABSTRACT OF THE DISCLOSURE

A method of retarding the evaporation of water from large bodies of water which includes covering a substantial proportion of the surface of the water with buoyant partially water filled containers which float in the water. The containers are preferably disposed with sufficient play between them so as to permit for the navigation of small craft therebetween.

---

The present invention relates to a method for reducing water evaporation particularly the evaporation of water from large bodies of water which are in continuous contact with the atmosphere.

Various methods have been proposed for reducing such water evaporation including the method of establishing and maintaining a mono-molecular layer of an insoluble substance of an evaporation retardatory nature on the water. Such known processes, however, whilst being successful to a limited extent when used on laboratory scale are subject to very distinct limitations when subject to field-scale applications. Thus, it is particularly difficult to apply and maintain the film over large areas and special provision has to be made for continually replacing the film which tends to disintegrate as a result of turbulence on the water surface.

It is the object of the present invention to provide a new and improved method for retarding water loss by evaporation which method is not subject to the disadvantages referred to above.

According to the present invention there is provided a method of retarding water loss by evaporation from the surface of a body of water, comprising the step of covering a substantial proportion of the surface with buoyant, substantially flat, water filled containers.

The containers are preferably of rectangular shape and are arranged to float on the water surface, edge to edge, with sufficient overall play and/or flexibility as to allow for a small boat or the like to push its way to between adjacent sets of containers. The container envelopes can be formed of any suitable material, such as, for example, reinforced plastic, aluminium or the like, the specific gravity of the material being chosen so that the containers float in the water with a degree of submergence which is adequate to prevent lifting and/or disruption of the containers in a storm. The fact that the evaporation retarding covering is made from separate elements and not from a unitary film allows for the relative motion of different parts of the covering whilst retaining the retardatory nature of the covering as a whole.

The specific gravity of the envelope material can be greater than that of water in which case the overall buoyancy of the container is ensured by coating the inner surface of the envelope with a foam plastic material.

The containers can be formed of any suitable size which can range, for example, from 0.25 square metres to 5000 square metres.

Figure 1:
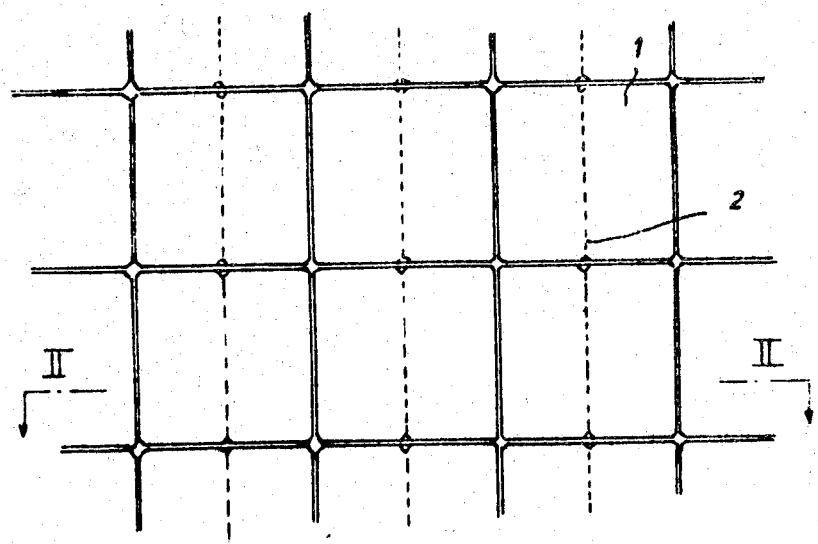
Figure 2:
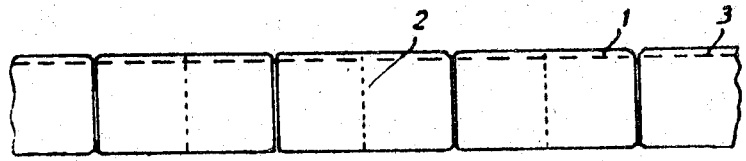

One example of a retardatory covering in accordance with the present invention will now be described by way of example and with reference to the accompanying drawings in which:

FIG. 1 is a plan view of the covering, and
FIG. 2 is a cross-sectional view of the covering shown in FIG. 1 taken along the line II—II.

As seen in the drawings, the covering is constituted of a plurality of juxtaposed rectangular containers 1 formed of a plastic material the containers being divided into sub-compartments by perforated partitions 2. The containers are filled with water to the extent that they lie submerged in the water to a depth indicated by the line 3.

The container envelopes which can be of very considerable sizes, for example up to 5000 square metres, are in their unfilled state kept rolled up and are brought to the site where they are to be laid by a small boat. The container envelope is then unrolled and filled with water through an opening (not shown) made for this purpose. In the case of the larger containers the opening is then sealed by means of a removable plastic plug. In the case of the smaller containers the opening is sealed by having a plastic strip stuck over it. When it is desired to remove the larger containers from the water, the plugs are removed, the container is emptied and the container envelope is rolled up thereby at the same time expelling the water. The larger containers themselves can be provided with towing lines whereby they can be towed into correct position. The smaller containers are emptied simply by perforating the envelope and expelling the water. These perforations can be resealed upon refilling of the envelope.

With such containers floating on the water movement occurs between the individual containers but, in view of the fact that the containers are adequately submerged in the water this movement, even in the case of a turbulent storm, does not result in the break-up of the covering as a whole. Furthermore, sufficient play exists between the individual containers for them to be pushed slightly aside so as to enable a small boat to navigate between sets of containers for the purposes of servicing the containers or the reservoir on which they float.

As indicated above, the containers can be formed of any suitable size, the partitions therein being provided for strengthening the structure. Furthermore, the optimum thicknesses of the containers range from 10 to 60 cm.

I claim:

1. A method of retarding water loss by evaporation from the surface of a large body of water, comprising at least partially filling with water a plurality of flexible, buoyant, closed top, substantially parallelpipedic shaped containers so that said containers will lie partially submerged in the water when placed in said large body of water; sealing said containers; and placing said buoyant, substantialy flat, closed containers, at least partially filled with water, into said large body of water to lie therein partially submerged and to cover a substantial portion of the surface of said large body of water.

2. A method in accordance with claim 1 wherein said containers are located in said large body of water with sufficient play therebetween for adjacent containers to be displaceable with respect to each other in order to permit the navigation of a small craft between containers.

3. A method in accordance with claim 1 including the steps of transporting each of said containers to the site of said large body of water in the form of an unfilled, rolled up envelope, unrolling the container and then carrying out said filling in the site of said large body of water via a suitable opening in the envelope, and then carrying out said sealing of said opening.

4. An evaporation retarding covering for retarding the loss of water by evaporation from the surface of a large body of water comprising a plurality of substantially parallelpipedic shaped, buoyant, closed top flexible, sealed containers, at least partially filled with water, and adapted to be disposed edge to edge in said large body of water and each to be partially submerged in said water.

5. An evaporation retarding covering in accordance with claim 4 wherein each said container comprises a substantially rectangular parallelpipedic envelope formed of plastic material reinforced by internally disposed partitions.

References Cited

UNITED STATES PATENTS

| | | | |
|---|---|---|---|
| 234,291 | 11/1880 | King | 220—26 |
| 289,557 | 12/1883 | Reinecke | 220—26 |
| 1,639,625 | 8/1927 | Afonin | 220—26 |
| 1,712,321 | 5/1929 | Afonin | 220—26 |
| 1,734,623 | 11/1929 | Griffin | 220—26 |
| 2,415,150 | 2/1947 | Stein | 220—26 |
| 2,640,623 | 6/1953 | Ryder | 229—51 |

FOREIGN PATENTS

| | | |
|---|---|---|
| 840,214 | 1/1939 | France. |
| 833,325 | 3/1952 | Germany. |
| 291,618 | 6/1928 | Great Britain. |

THERON E. CONDON, *Primary Examiner.*

JAMES R. GARRETT, *Examiner.*